(No Model.)
L. & C. STAPLES.
NUT LOCK.
No. 334,058.        Patented Jan. 12, 1886.
Fig. 1      Fig. 2      Fig. 3
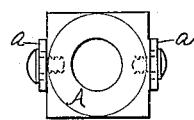
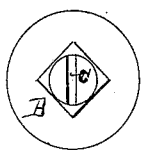
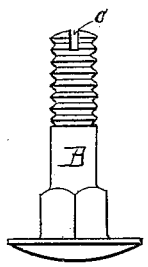
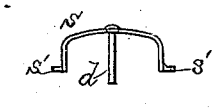
Fig. 4
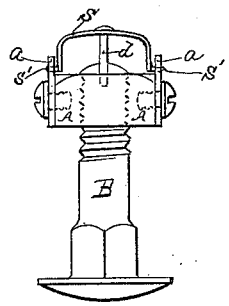
Fig. 5
Witnesses:        Inventors:
Nathan H. Freeman      Levi Staples
Samuel Ames        Charles Staples
       by Henry Marsh Jr.
           Attorney.

UNITED STATES PATENT OFFICE.

LEVI STAPLES, OF BARRINGTON, AND CHARLES STAPLES, OF PROVIDENCE, RHODE ISLAND.

NUT-LOCK.

SPECIFICATION forming part of Letters Patent No. 334,058, dated January 12, 1886.

Application filed January 23, 1885. Serial No. 153,714. (No model.)

*To all whom it may concern:*

Be it known that we, LEVI STAPLES, a resident of Barrington, county of Bristol, and State of Rhode Island, and CHARLES STAPLES, of the city and county of Providence, in said State of Rhode Island, both citizens of the United States, have invented certain new and useful Improvements in Safety-Nuts, of which the following is a specification.

Prior to our invention safety-nuts had been known and made in which the nut was secured by a set-screw tapped through it to engage a notch in the bolt. There had also been known a safety-nut in which a pawl or dog engaged notches on the nut to prevent its turning. Such devices have in practical use been found objectionable for the reason that they rendered the nut unserviceable after removal, and that they enhanced the original cost of the nuts without corresponding increase of efficiency.

The object of our invention is to provide a simple, inexpensive, and efficient means of locking a nut on its bolt. These objects we attain by the special mechanism illustrated in the accompanying drawings, in which—

Figure 1 is a top plan, front, and side elevation of the nut and its lugs. Fig. 2 shows the bolt in top plan and elevation. Fig. 3 shows a spring-catch in top plan and side elevation. Fig. 4 shows the lug in front and side elevation. Fig. 5 shows in elevation the several parts assembled in one form of our invention.

Similar letters denote like parts where they occur in the drawings.

A represents the screw-nut, which is provided with two lugs, $a\ a$, which may consist of two straps secured to the sides of the nut by rivets or screws, as shown, or they may be cast or forged with the nut to form an integral part thereof. These lugs, however made, are provided with slots $b\ b$. The spring-catch $s$ is formed by bending a thin flat strap of metal into the form shown, with offsets $s'\ s'$, adapted to engage the slots $b\ b$ in the lugs $a$. Midway of this catch $s$ we secure a dependent flat post, $d$, adapted to engage a transverse slot, $c$, in the end of the bolt B.

In practical use and operation of our invention, the nut having been screwed onto the bolt, the spring-catch is applied so that its lugs $s'\ s'$ will engage the slots $b\ b$ in the lugs $a\ a$ and its dependent post $d$ will enter and rest in the slot $c$ in the bolt B, thereby preventing the nut from turning on the bolt. To release the nut, the sides of the spring-catch are forced inwardly toward each other by pliers or other suitable means until the lugs $s'\ s'$ are forced out of engagement with the slots $b\ b$.

We prefer, for convenience in releasing the spring-catch, to make one of the lugs $s'\ s'$ shorter than the other.

In place of the lugs $a\ a$, we can, without departing from the principle or efficiency of our invention, use slots cut at an angle through the top and adjacent side faces of the nut, and adapted to receive the lugs or offsets of the spring catch for locking purposes.

We claim as our invention—

1. The nut A, provided with the lugs $a\ a$, in combination with a spring-catch, $s$, provided with lugs $s'\ s'$, adapted to engage slots $b\ b$ in the lugs $a\ a$.

2. The combination of the bolt B, provided with the transverse slot $c$, with a nut, A, and a spring-catch, $s$, provided with a dependent flat post, $d$, said post $d$ being adapted to engage the slot $c$ in the end of the bolt B, for locking purposes.

In testimony whereof we have hereunto set our hands, in presence of two witnesses, this 1st day of January, eighteen hundred and eighty-five, (1885).

LEVI STAPLES.
CHARLES STAPLES.

Witnesses:
HENRY MARSH, Jr.,
SAMUEL AMES.